United States Patent
Obara

(10) Patent No.: US 7,279,227 B2
(45) Date of Patent: Oct. 9, 2007

(54) SPRAYING PISTON RING

(75) Inventor: Ryou Obara, Niigata (JP)

(73) Assignee: Kabushiki Kaisha Riken, Tokyo (JP)

(*) Notice: Subject to any disclaimer, the term of this patent is extended or adjusted under 35 U.S.C. 154(b) by 0 days.

(21) Appl. No.: 10/501,503

(22) PCT Filed: Jan. 17, 2003

(86) PCT No.: PCT/JP03/00340

§ 371 (c)(1),
(2), (4) Date: Sep. 3, 2004

(87) PCT Pub. No.: WO03/062680

PCT Pub. Date: Jul. 31, 2003

(65) Prior Publication Data

US 2005/0069724 A1    Mar. 31, 2005

(30) Foreign Application Priority Data

Jan. 18, 2002    (JP)    ............ 2002-010086

(51) Int. Cl.
B22F 3/12   (2006.01)
B32B 3/10   (2006.01)
B32B 15/01  (2006.01)
C22C 49/02  (2006.01)

(52) U.S. Cl. ............ 428/546; 428/564; 428/614; 428/677; 428/684; 384/907; 384/913

(58) Field of Classification Search .......... 428/546, 428/564, 614, 677, 684; 384/907, 913
See application file for complete search history.

(56) References Cited

U.S. PATENT DOCUMENTS

| | | | |
|---|---|---|---|
| 3,932,228 A | * | 1/1976 | Sugiyama et al. ....... 123/193.2 |
| 4,430,386 A | | 2/1984 | Watanabe et al. |
| 4,579,712 A | * | 4/1986 | Mori ........................ 419/9 |
| 4,716,766 A | * | 1/1988 | Baureis ..................... 73/827 |
| 5,256,494 A | * | 10/1993 | Tanaka et al. ........... 428/552 |

(Continued)

FOREIGN PATENT DOCUMENTS

CN    1225152 A    8/1999

(Continued)

OTHER PUBLICATIONS

RD 431007 A, Derwent English Abstract, Wear-resistant manganese-silicon bronze thermal spray coating comprises copper, manganese, silicon, aluminum, graphite and zinc, Mar. 2000.*

(Continued)

Primary Examiner—Jennifer McNeil
Assistant Examiner—Jason L. Savage
(74) Attorney, Agent, or Firm—Birch, Stewart, Kolasch & Birch, LLP

(57) ABSTRACT

A thermal spray coated piston ring having improved initial running-in propery, and having scuffing resistance and wear resistance is provided. The spray coating film (3) of the piston ring (1) contains from 2 to 40 mass % of Sn and from 5 to 50 mass % of graphite, and if necessary, P, Sb, Co, Be, Cr, Mn, Si, Cd, Zn, Fe, Ni and/or Pb, the balance essentially consisting of Cu.

15 Claims, 5 Drawing Sheets

U.S. PATENT DOCUMENTS

| | | | |
|---|---|---|---|
| 5,298,336 A * | 3/1994 | Tanaka et al. | 428/552 |
| 5,315,970 A * | 5/1994 | Rao et al. | 123/193.2 |
| 5,358,753 A * | 10/1994 | Rao et al. | 427/451 |
| 5,364,663 A * | 11/1994 | McCune et al. | 427/449 |
| 5,482,782 A * | 1/1996 | Tanaka et al. | 428/553 |
| 5,484,662 A * | 1/1996 | Rao | 428/553 |
| 5,875,702 A * | 3/1999 | Kawagoe et al. | 92/12.2 |
| 6,123,009 A * | 9/2000 | Kanayama et al. | 92/71 |
| 6,457,399 B1* | 10/2002 | Jingu | 92/71 |
| 6,492,033 B2* | 12/2002 | Sato et al. | 428/553 |
| 6,541,127 B1* | 4/2003 | Tomikawa et al. | 428/652 |
| 6,613,453 B2* | 9/2003 | Sato et al. | 428/676 |
| 6,815,400 B2* | 11/2004 | Jee et al. | 508/113 |
| 6,854,183 B2* | 2/2005 | Greene et al. | 29/898.058 |
| 2002/0020286 A1* | 2/2002 | Mizutani et al. | 92/71 |
| 2004/0091732 A1* | 5/2004 | Sato et al. | 428/548 |

FOREIGN PATENT DOCUMENTS

| | | |
|---|---|---|
| JP | 11-080921 A | 3/1999 |
| JP | 11-247712 A | 9/1999 |
| JP | 2000-507679 A | 6/2000 |
| WO | WO-98/25014 A1 | 6/1998 |
| WO | WO-98/25017 A1 | 6/1998 |

OTHER PUBLICATIONS

JP 2005113225 A, Derwent English Abstract, Lead-free copper group sliding component such as swash plate of a swash-plate-type compressor, Apr. 2005.*

* cited by examiner

A-A CROSS SECTION

SPRAYING PISTON RING

TECHNICAL FIELD

The present invention relates to a piston ring used for an internal combustion engine, a compressor and the like. More particularly, the present invention relates to a piston ring having a thermal spray coating film on at least the outer peripheral sliding surface.

BACKGROUND TECHNIQUE

Along with recent power increase of engines, the requirements for piston rings have become more and more severe. Improved wear resistance and scuffing resistance are required for piston rings. With a view to reducing cost by means of saving oil consumption and decreasing the running-in time, the so-called initial running-in property must be improved, that is, early running-in of the piston rings and a cylinder liner should be attained.

Heretofore, in order to improve the initial running-in properties of the sliding members, for example piston rings, a copper plating film or a thermal spray soft coating film has been formed on the outermost peripheral surface of the piston rings. However, when the piston rings provided with the copper plating film are used in a high-performance Diesel engine, since the copper plating film is too soft, it wears off before the initial running-in is completed, which disadvantageously leads to wear and scuffing of the piston rings.

It is disclosed in Japanese Published Patent Application (kokai) No. 11-80921 that a copper-based alloy sliding material, consisting of from 7 to 11 mass % of Al, from 0.5 to 8 mass % of one or more of Fe, Ni and Mn, and the balance of Cu, is plasma or arc sprayed to form a thermal spray coating film, to be used as an initial running-in coating film. However, since this coating film is hard and is free of a self-lubricating component, the initial running-in property is not satisfactory.

Furthermore, it is disclosed in Japanese Translation of PCT International Application No. 2000-507679 that the thermal spray coating film, which contains from 5 to 60% of a solid state lubricant, such as graphite, from 40 to 95% of a metal binder such as Ni, Al and Si, and optionally less than 15% of an organic binder, is used to solve the problems as described above. However, since this coating film is as soft as the Cu plating film, the wear resistance is unsatisfactory such that the coating film disadvantageously wears off before the initial running-in is completed.

DISCLOSURE OF INVENTION

It is an object of the present invention to solve the problems of the thermal spray coating of Japanese Published Patent Application (kokai) No. 11-80921 and Japanese Translation of PCT International Application No.2000-507679 and to provide a thermal spray coated piston ring, which has improved initial running-in property, scuffing resistance and wear resistance.

The present inventors made energetic researches in view of the object mentioned above and then discovered that the initial running-in property, wear resistance and scuffing resistance of a piston ring are improved by means of mixing Cu, Sn and graphite in a predetermined proportion and thermal spray coating of the mixture on the sliding surface of a piston ring. As a result, the present invention is completed.

Namely, the thermal spray coated piston ring according to the present invention comprises at least on the outer peripheral surface thereof, a thermal spray coating film which contains from 2 to 40 mass % of Sn and from 5 to 50 mass % of graphite, the balance essentially consisting of Cu.

The thermal spray coating film essentially consists of Cu, Sn and graphite. The graphite particles contained in the thermal spray coating film are dispersed therein and enhance the self-lubricating property of the coating. The particles of graphite prevent the coating film from wearing off until the formation of the running-in surface, which is formed by wearing the copper-based alloy by the opposed shaft. When the content of graphite particles is less than 5 mass % with the proviso that the entire thermal spray coating film is 100 mass %, the self-lubricating property is poor. On the other hand, when the content of graphite particles exceeds 50 mass %, the coating film becomes soft so that the coating film wears off before the initial running-in is completed. The content of graphite particles is, therefore, from 5 to 50 mass %, and is preferably from 5 to 20 mass %.

The Sn, which is plasma-sprayed and included in the coating film, neither forms nor essentially forms hard matter such as oxide. Essential non-formation of hard matter such as oxide herein means that the microscopic observation of FIG. 4 described hereinbelow detects pores formed by thermal spraying but not any hard matter. When Cu, in which Sn is preliminarily alloyed, is thermal-sprayed, Sn is again dissolved in the Cu alloy and hardens the Cu alloy in appropriate level. Namely, although a Cu—Sn intermetallic compound, which has poor initial running-in property, may be formed in the Cu—Sn pre-alloy starting material, this intermetallic compound is again dissolved in the solid solution of the Cu—Sn alloy during the thermal spraying. The solid solution structure or essential solid-solution structure can, therefore, be formed. Essential solid solution herein means that the microscopic observation of FIG. 4 described hereinbelow detects pores formed by thermal spraying but not any intermetallic compound. The intermetallic compound is hard and is detrimental for the initial running-in property, while the Cu-phase dissolving Sn has improved initial running-in property. Meanwhile, when the Sn powder and Cu powder are thermal-sprayed, the formed microstructure is, depending upon the thermal-spray coating condition, such that the Cu and Sn phases are dispersed. Specifically, although the composition according to the present invention is within a range where the Sn—Cu intermetallic compound is formed, since the respective powders are rapidly cooled while not being completely melted together, the intermetallic compound is essentially not formed. The Sn phase, which has improved initial running-in property, is, therefore, formed.

When the Sn content is less than 2 mass %, with the proviso that the entire thermal spray coating film amounts to 100 mass %, the coating hardness is too low to attain the wear resistance. On the other hand, when the Sn content is more than 40 mass %, a large amount of the Sn phase precipitates in the thermal spraying coating film, so that its wear resistance tends to be impaired. The Sn content is, therefore, from 2 to 40 mass %, and is preferably from 5 to 25 mass %.

One or more of P, Sb, Co, Be, Cr, Mn, Si, Cd, Zn, Fe, Ni and Pb may be added to the thermal-spray coating material having the Cu—C—Sn based components mentioned above. P improves the fluidity of the Cu alloy and densifies the thermal spray coating structure. However, when the P content is more than 1.0 mass %, the alloy is disadvantageously hardened. A preferable P content is from 0.03 to 0.5 mass %.

Pb forms a soft Pb phase or a Pb—Sn eutectic structure and hence exerts a favorable influence upon the initial running-in property. However, since each of these phases has a low-melting point, it may dissolve and exude at the operating temperature of the piston rings. The Pb content should, therefore, be 20 mass % or less, and is preferably from 0.03 to 5.0 mass %.

Within the range of the Sn content according to the present invention, Be shows no age (precipitation) hardening as in the Cu—Be alloy. Be mainly performs the solid-solution hardening.

The other elements, i.e., Sb, Co, Cr, Mn, Si, Cd, Zn, Fe and Ni, may be alloyed with the Cu and then thermal-sprayed. In this case, these elements are again dissolved in the solid solution and perform the solid-solution hardening. In a case where, these elements, particularly Cr, Mn, Fe and Ni, are thermal-sprayed in the form of a single element, they are dispersed in the coated film in the form of a single element and enhance the wear resistance. However, at more than 5% of Sb, more than 5% of Co, more than 5% of Be, more than 5% of Cr, more than 15% of Mn, more than 15% of Si, more than 15% of Cd, more than 15% of Zn, more than 5% of Fe, or more than 20% of Ni in terms of mass percentage, the hardness of the alloy as a whole increases. It becomes difficult to maintain a preferable average hardness of 300HV0.1 or less. The total content of these elements is preferably 25 mass % or less.

EMBODIMENTS OF INVENTION

Figure 1:
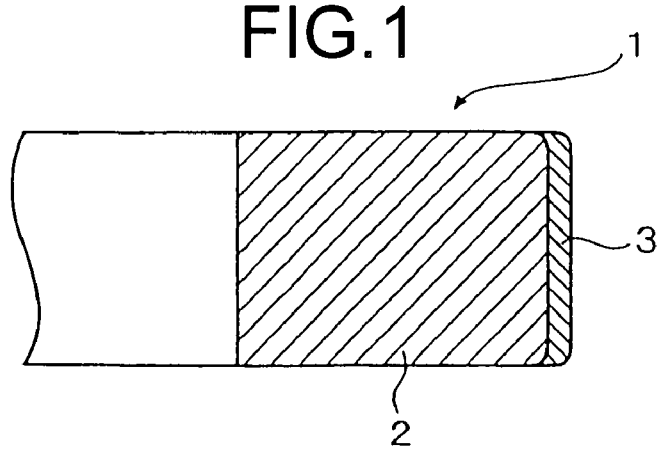
FIG. 1 is a schematic cross-sectional view of a piston ring according to an example of the present invention.
Figure 2:
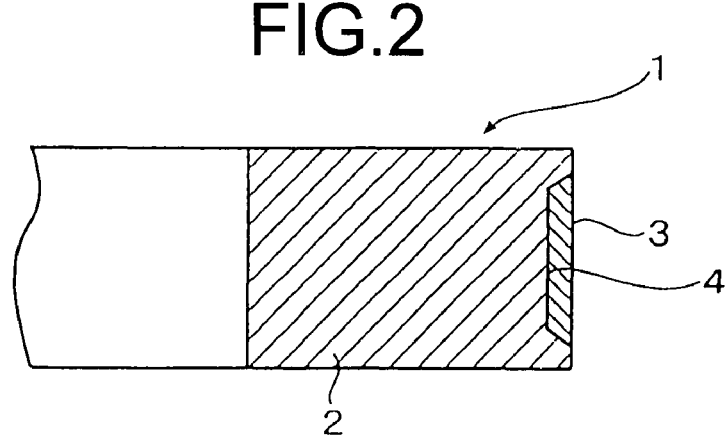
FIG. 2 is a schematic cross-sectional view of a piston ring according to another example of the present invention.

Referring to FIGS. 1 and 2, a schematic cross-sectional view of a piston ring according to examples of the present invention is illustrated. The piston ring 1 comprises a piston ring body 2 of known cast iron, stainless steel or the like and has a flat outer peripheral sliding surface or a groove on the outer peripheral sliding surface. The thermal spray coating film 3 is formed on the flat outer peripheral sliding surface or in a groove on the outer peripheral sliding surface. If necessary, the thermal spray coating film 3 may be formed on the upper and lower surfaces.

Figure 3:
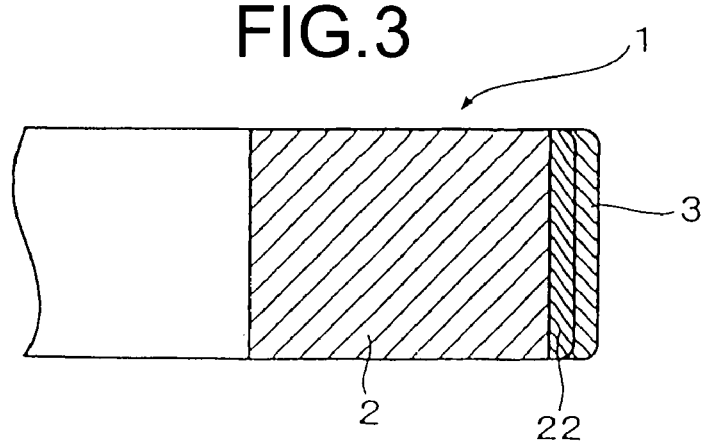
FIG. 3 is a schematic cross-sectional view of a piston ring according to a further example of the present invention.

Referring to FIG. 3, a schematic cross-sectional view of a piston ring according to another example of the present invention is illustrated. Beneath the thermal spray coating film 3 another coating 22, i.e., the hard chromium plating film, the hard thermal spray coating film or the like is formed for the purpose of wear resistance.

The thermal spray coating film 3 may be formed by the ordinary, flame spray coating, arc spray coating, high-velocity flame spray coating, plasma spray coating or low-pressure plasma spray coating but is preferably formed by the plasma spray coating since the graphite particles disperse well.

Figure 5:
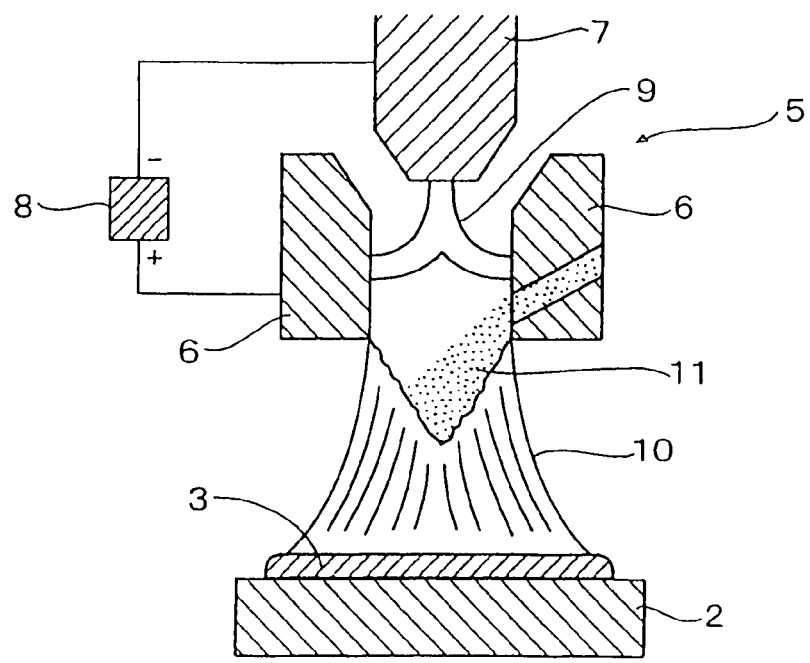
FIG. 5 is a schematic cross-sectional drawing of the plasma spray coating apparatus (a plasma gun).

Referring to FIG. 5, a plasma gun 5 used for the plasma spray coating is illustrated. The plasma gun 5 comprises an annular anode 6 made of copper or the like, a cathode 7 made of tungsten or the like and is located above the anode 6, and an electric power source 8. The anode 6 provides a nozzle for ejecting the plasma gas therethrough. Cavities (not shown) are formed in the anode 6 and cathode 7 for cooling.

In order to perform the plasma spray coating, a piston ring body 2 is located first at a position from 20 to 300 mm distant from the front end of the anode 6. Inert gas such as Ar and the like is introduced in the nozzle. Under this state, a high voltage is applied between the anode 6 and the cathode 7 to generate the arc discharge 9 by which the inert gas is heated and made into the plasma. The plasma gas expands and is ejected through the nozzle at a high temperature and high speed, and forms the plasma jet stream 10.

The starting-material powder 11 is blended to provide the desired composition and has from 5 to 125 μm of an average particle diameter and is charged into the plasma jet stream 10. The starting material may consist of the pre-alloy powder or powders of single elements. The pre-alloy powder and the powders of single elements may be used together. The graphite powder may be coated with copper of electroless-plating. The feeding port of the powder 11 may be formed in the anode 6 as shown in FIG. 5 or may be provided directly under the anode 6. The powder 11 is melted and accelerated in the plasma jet stream 10 and impinges upon the piston ring body 2. The impinged powder is instantaneously flattened and cooled to the temperature of the body 2. As a result, thermal spray coating film 3 is formed.

Unevenness of 10 to 20 μm in size is preferably preliminarily formed on the surface of the piston ring body 2 by means of shot-blasting and the like. When molten particles impinge on the convexities of the uneven surface, the convexities are locally melted so that the alloying easily occurs. In addition, an anchoring effect occurs mechanically due to solidification-contraction stress of the molten particles and lead to strong adhesion force of the coating film. Immediately before the flame spray coating, the piston ring body 2 may be preliminarily heated to a high temperature in the range of 400 to 550° C., and the surface of the piston-ring body 2 is cleaned by the transition arc, thereby activating the surface of the body 2. An inter-diffusion layer is formed between the piston-ring body 2 and the thermal spray coating film 3 and leads to strong adhesion.

The thermal spray coating film 3 is preferably from 50 to 300 μm thick and is more preferably from 100 to 300 μm thick.

The present invention is hereinafter described more in detail with reference to specific examples.

BEST MODE FOR CARRYING OUT INVENTION

Figure 6:
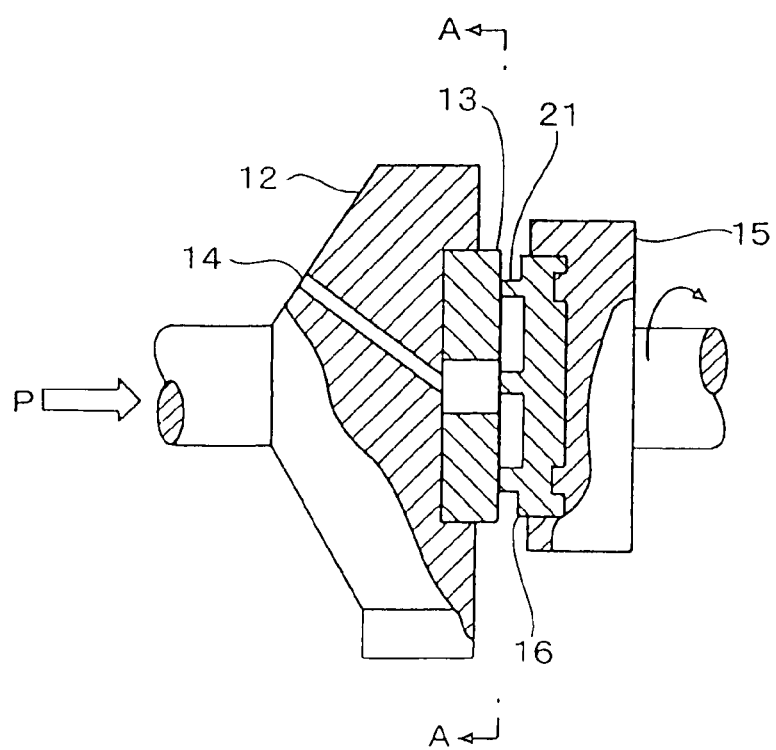
FIG. 6 is a schematic drawing of the ultra-high pressure wear tester.

In the present examples, the scuffing test was carried out using the ultra high pressure wear tester shown in FIG. 6.

Figure 7:
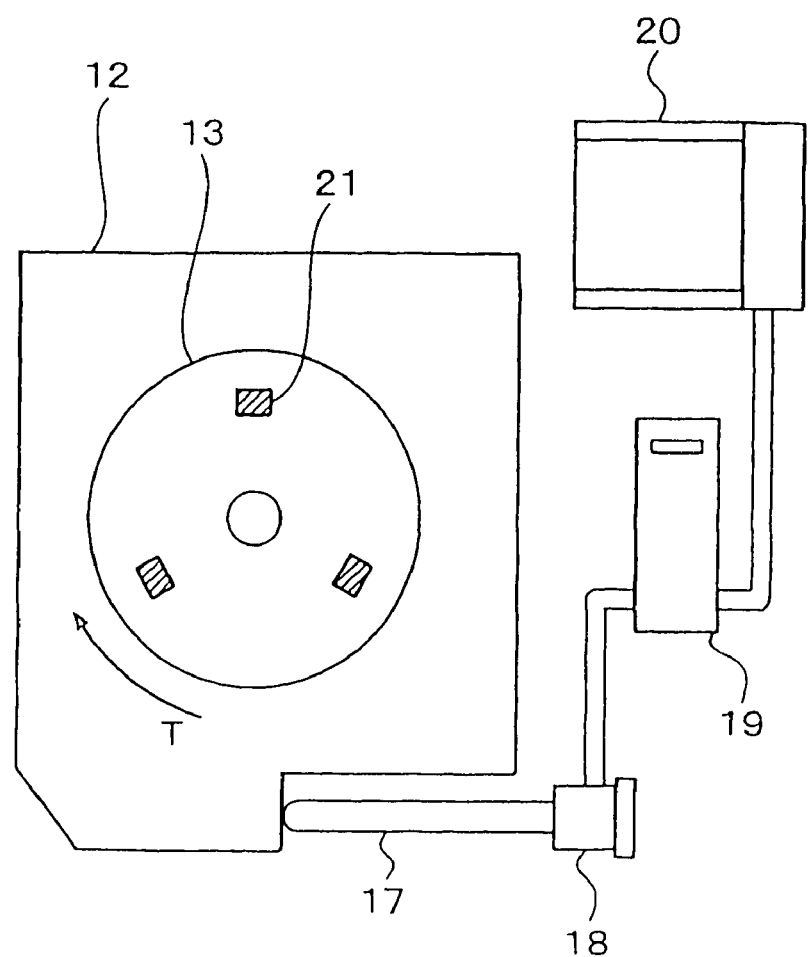
FIG. 7 is a cross-sectional view along A-A of FIG. 6.6

The apparatus of the ultra-high pressure wear tester used in the present test and the testing conditions were as follows. The essential parts of the testing apparatus are schematically shown in FIG. 6 and FIG. 7, which is a cross-sectional drawing along the line A-A. A disc 13 (the opposite material) is 80 mm in diameter and 10 mm in thickness and is polish-finished. The disc 13 is detachably mounted on the stator holder 12. Lubricating oil is supplied on the center of the disc 13 via the oil hole 14. A not-shown hydraulic apparatus exerts a predetermined pushing pressure P to the disc 13 in the right-hand direction in the drawing. A rotor 15 is arranged opposite to the disc 13 and is rotated at a predetermined speed by means of a not-shown driving apparatus. A specimen 16 mounted on the rotor 15 has pin-form projections 21 of 5 mm square and is slidably in contact with the disc 13. The coating film is formed on the projections.

Using the apparatus as described hereinabove, the predetermined pushing pressure P is applied on the stator holder 12, so that the disc 13 and the pin-form projections 21 are brought into contact with one another at a predetermined surface pressure. While in such contact, the rotor 15 is caused to rotate. The friction between the test piece 16 and the opposite disc 13 occurs under the constant pressure. This friction causes a torque T on the stator holder 12, which torque activates a load cell 18 via the stainless steel fiber 17. Change in the torque effect is detected by the dynamic strain gauge 19 and is recorded in the recorder 20. Upon sudden rise of the torque effect, it is judged that scuffing has occurred, and the time until the scuffing is used for evaluating the scuffing resistance and initial running-in property. The wear amount of the coating film until the scuffing is used for evaluating the wear resistance.

The test conditions are as follows.
Friction Speed: 8 m/second
Opposite Material: FC25
Contact Surface Pressure: holding at 2 MPa for 3 minutes, then increasing the pressure up to 3 MPa, and holding this pressure until scuffing.
Lubricating Oil: motor oil #30
Feeding Amount: 1 cc of the oil is applied on the disc at the beginning, and, then no lubrication.
The prepared powders were as follows.
Mixed Powder 1: 8 mass % of Sn powder, 20 mass % of graphite powder, and 72 mass % of Cu powder
Mixed Powder 2: 30 mass % of $Cr_3C_2$ powder, 60 mass % of Mo powder, 10 mass % of Ni—Cr alloy powder (Ni: 80 mass %; Cr: 20 mass %). The respective powders are 325 mesh.

Mixed Powder 2 was used as the bond coating, and Mixed Powder 1 according to the present invention was used as the top coating. These powders were plasma sprayed on the surface of pin-form projections 21 of the specimen 16 to form an approximately 100 μm thick thermal spray coating film. The thermal spray coating conditions were as follows.

Thermal Spray Coating Conditions
Gun Used: a plasma spray coating gun, a product of METECO Corporation—9 MB (commercial name)
Voltage: 70 V
Current: 500 A
Protective Environmental Gas: Ar
Preheating Temperature of Body: 400° C.

Figure 4:
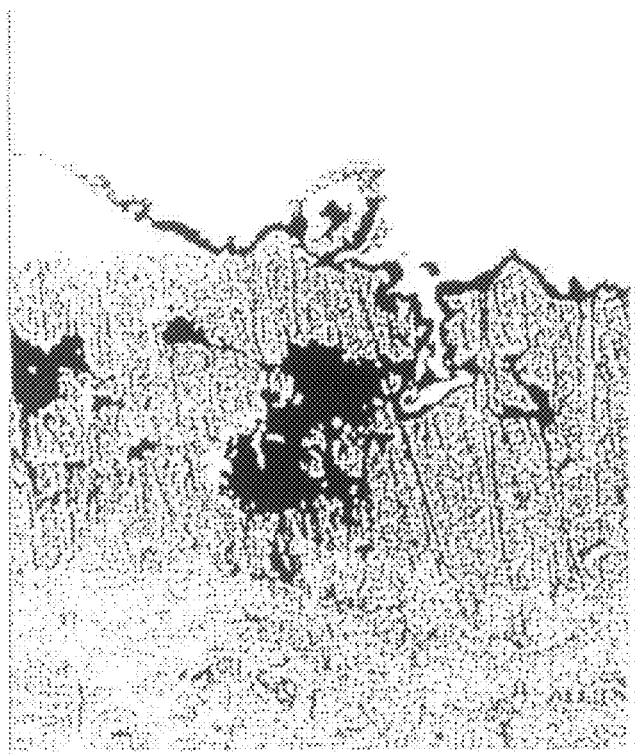
FIG. 4 is an optical microphotograph (magnification 100 times) of the metal structure of a specimen, on which a plasma thermal spray coating film is formed in an example of the present invention.

Referring to FIG. 4, is shown an optical microphotograph (magnification 100 times) of the metal structure of the obtained specimen 16 at the curved surface. As is clear from FIG. 4, thermal spray coating film consists of two layers. An upper coating layer is formed on a lower coating layer which has a surface roughness as thermal spray coated and is not mechanically machined. The lower coating layer, i.e., bond coating part 22 (the lower part of the photograph) and the upper coating layer 4 are, at the interface, alloyed and diffusion bonded. Pores in the coating film 3 are extremely small. The average hardness of the thermal spray coating film 4 of Mixed Powder 1 was 150Hv0.05. A black portion in the thermal spray coating film almost at the center of the photograph is graphite.

Figure 8:
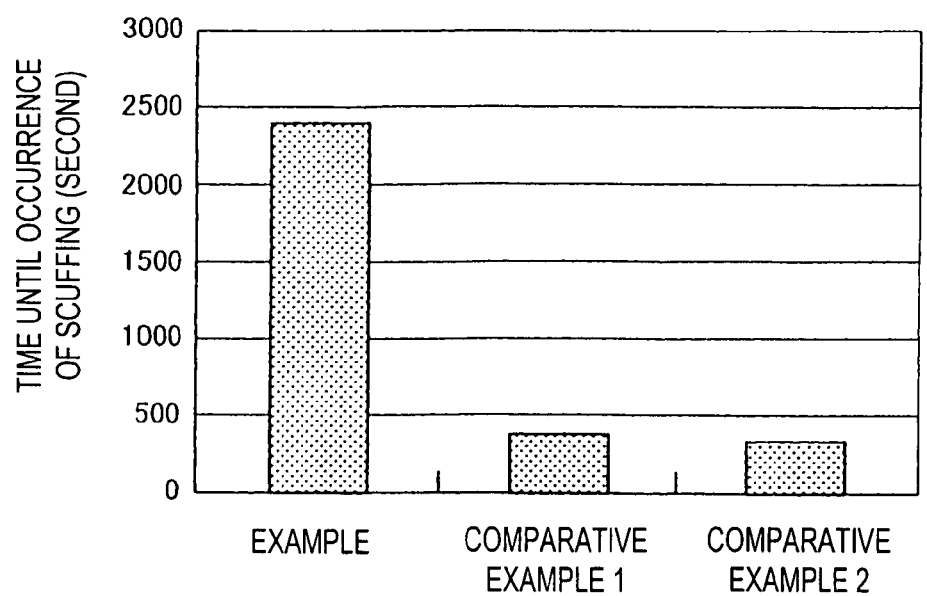
FIG. 8 is a graph showing the time until scuffing in the wear test of the example and the comparative examples.
Figure 9:
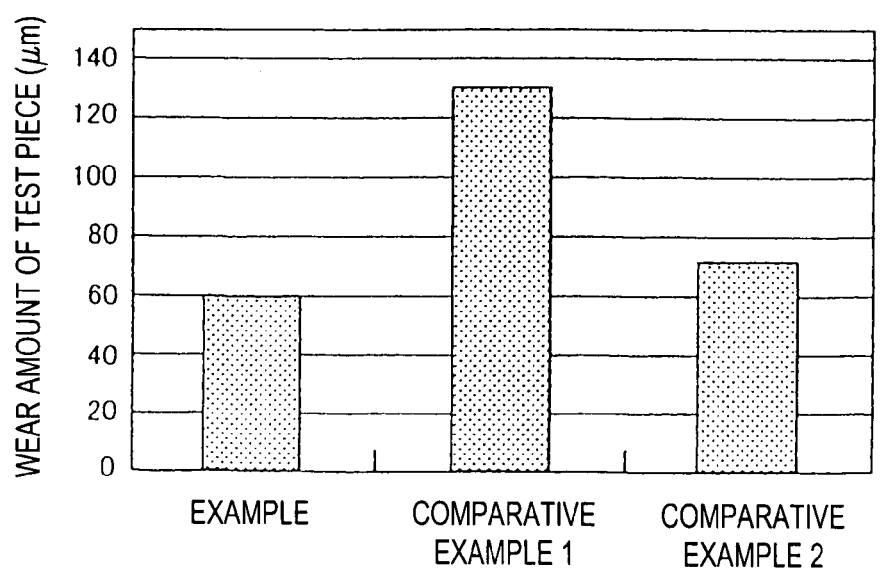
FIG. 9 is a graph showing the wear amount of test pieces at the occurrence of scuffing in the wear test of the examples and comparative examples.

The obtained specimen 16 and the disc 13 made of FC 25 were mounted in the ultra high-pressure wear tester mentioned above and were subjected to the scuffing test under the conditions described below. The time until scuffing of the specimen 16 and the disc 13 is shown in FIG. 8. The wear amount of the specimen at the occurrence of the scuffing is shown in FIG. 9.

COMPARATIVE EXAMPLE 1

Mixed Powder 3, which consists of 8.5 mass % of Si powder, 23 mass % of graphite powder, and 68.5 mass % of the Al alloy powder, and Mixed Powder 4, which consists of 30 mass % of $Cr_3C_2$ powder, 60 mass % of Mo powder, and 10% of Ni—Cr alloy powder (Ni: 80 mass %, and Cr: 20 mass %) were prepared. Mixed Powder 4 was used as the bond coating, and Mixed Powder 3 was used as the top coating. These powders were plasma sprayed on the surface of pin-form projections 21 of the specimen 16, which consisted of the same material as the Example to form an approximately 100 μm thick thermal spray coating film. The thermal spray coating conditions were as follows. The hardness of the thermal spray coating film of Mixed Powder 3 was 110Hv0.05.

Thermal Spray Coating Conditions
Gun Used: a plasma spray coating gun, a product of METECO Corporation —9 MB (commercial name)
Voltage: 70 V
Current: 500 A
Protective Environmental Gas: Ar
Preheating Temperature of Body: 400° C.

The obtained specimen 16 and the same disc 13 as in the Example were coupled and were subjected to the same scuffing test as in the Example. The time until scuffing of the specimen 16 and the disc 13 is shown in FIG. 7. The wear amount of the specimen at the occurrence of the scuffing is shown in FIG. 8.

COMPARATIVE EXAMPLE 2

Mixed Powder 5, which is described in Japanese Published Patent Application (kokai) 10-31600 and consists of 9 mass % of Al powder, 1 mass % of Fe powder, and 90 mass % of the Cu alloy powder, and Mixed Powder 6, which consists of 10 mass % of $Cr_3C_2$ powder, 31 mass % of Mo powder, and 10% of Ni—Cr alloy powder (Ni: 80 mass %, and Cr: 20 mass %) were prepared. Mixed Powder 6 was used as the bond coating, and Mixed Powder 5 was used as the top coating. These powders were plasma-sprayed on the curved surface of pin-form projections 21 of the specimen 16, which consisted of the same material as the Example to form an approximately 100 μm thick thermal spray coating film. The thermal spray coating conditions were as follows.

Thermal Spraying Conditions

Gun Used: a plasma spray coating gun, a product of METECO Corporation—9MB (commercial name)

Voltage: 70 V

Current: 500 A

Protective Environmental Gas: Ar

Preheating Temperature of Body: 400° C.

The obtained specimen 16 and the same disc 13 as in the Example were coupled and were subjected to the same scuffing test as in the Example. The time until scuffing of the specimen 16 and the disc 13 is shown in FIG. 8. The wear amount of the specimen at the occurrence of the scuffing is shown in FIG. 9.

As is clear from FIGS. 8 and 9, the scuffing resistance, the wear resistance, and the initial running-in property of the specimen 16 according to the Example are superior to those of the comparative examples.

INDUSTRIAL APPLICABILITY

As is described hereinabove, the piston ring according to the present invention, which has a thermal spray coating film of a mixture of Cu, Sn, and graphite in a predetermined proportion on the outer peripheral sliding surface, has improved scuffing resistance, wear resistance and initial running-in property.

The invention claimed is:

1. A thermal spray coated piston ring, characterized in that it is provided with a thermal spray coating film which contains from 2 to 40 mass % of Sn and from 5 to 50 mass % of graphite, the balance essentially consisting of Cu.

2. A thermal spray coated piston ring according to claim 1, characterized in that said thermal spray coating film is formed on the outermost peripheral surface.

3. A thermal spray coated piston ring according to claim 1 characterized in that the thermal spray coating film contains, except for the general impurities of Sn bronze, one or more kinds selected from the group consisting of P, Sb, Co, Be, Cr, Mn, Si, Cd, Zn, Fe, Ni and Pb, and the amount of these components are: 1.0% of P at the highest, 5% of Sb at the highest, 5% of Co at the highest, 5% of Be at the highest, 5% of Cr at the highest, 15% of Mn at the highest, 15% of Si at the highest, 15% of Cd at the highest, 15% of Zn at the highest, 5% of Fe at the highest, 20% of Ni at the highest, and 20% of Pb at the highest, the balance being Cu.

4. A piston ring according to claim 3, wherein the total amount of one or more elements selected from the group consisting of P, Sb, Co, Be, Cr, Mn, Si, Cd, Zn, Fe, Ni and Pb, is 25 mass % at the highest.

5. A thermal spray coated piston ring according to claim 1, characterized in that the average hardness of the thermal spray coating film is 300Hv0.1 or less.

6. A thermal spray coated piston ring according to claim 1, characterized in that an upper coating of said thermal spray coating according to claim 1 is formed on a non-mechanically machined lower coating layer as thermal spray coated.

7. A thermal spray coated piston ring according to claim 1, wherein said thermal spray coating film is from 50 to 500 μm thick.

8. A thermal spray coated piston ring according to claim 7, wherein said thermal spray coating film is from 100 to 500 μm thick.

9. A thermal spray coated piston ring according to claim 1, wherein graphite is present in an amount of from 5 to 20 mass %.

10. A thermal spray coated piston ring according to claim 1, wherein Sn is present in an amount of from 5 to 25 mass %.

11. A thermal spray coated piston ring according to claim 1, further comprising P in an amount of from 0.03 to 0.5 mass %.

12. A thermal spray coated piston ring according to claim 1, further comprising Pb in an amount of from 0.03 to 5.0 mass %.

13. A thermal spray coated piston ring according to claim 1, characterized in that said thermal spray coating film comprises an upper coating layer and a lower coating layer, wherein the upper coating layer is formed on the lower coating layer, and wherein the lower coating layer has a surface roughness, and is not mechanically machined.

14. A thermal spray coated piston ring, characterized in that said thermal spray coating film consists of multiple layers, an upper coating layer provided with a thermal spray coating film which contains from 2 to 40 mass % of Sn and from 5 to 50 mass % of graphite, the balance essentially consisting of Cu is formed on a lower coating layer provided with a hard chromium plating film or a hard thermal spray coating film for the purpose of wear resistance.

15. A thermal spray coated piston ring, which comprises multiple layers, an upper coating layer provided with a thermal spray coating film which contains from 2 to 40 mass % of Sn and from 5 to 50 mass % of graphite, the balance consisting essentially of Cu formed on a lower coating layer provided with a hard chromium plating film or a hard thermal spray coating film for the purpose of wear resistance.

* * * * *